United States Patent
Ruth

[11] Patent Number: 5,957,613
[45] Date of Patent: Sep. 28, 1999

[54] TURNBUCKLE ACTUATOR

[75] Inventor: Gregory Philip Ruth, Birch Run, Mich.

[73] Assignee: General Motors Corporation, Detroit, Mich.

[21] Appl. No.: 09/131,782

[22] Filed: Aug. 10, 1998

[51] Int. Cl.⁶ .................................................. F16B 7/06
[52] U.S. Cl. ........................................... 403/48; 280/775
[58] Field of Search ........................... 280/775; 403/48, 403/47, 43, 53, 72, 66, 81

[56]  References Cited

U.S. PATENT DOCUMENTS

| | | |
|---|---|---|
| 407,559 | 7/1889 | Wells . |
| 485,484 | 11/1892 | Arnold . |
| 1,065,408 | 6/1913 | Thorsby . |
| 1,226,830 | 5/1917 | Walker . |
| 1,359,391 | 11/1920 | Landymore et al. . |
| 2,165,478 | 7/1939 | Gross ........................................ 403/48 |
| 2,557,736 | 6/1951 | Fox ........................................ 155/161 |
| 2,609,959 | 6/1952 | Bender .................................... 280/33 |
| 4,031,936 | 6/1977 | Curtis ...................................... 151/37 |
| 4,074,889 | 2/1978 | Engel ..................................... 251/298 |
| 4,095,483 | 6/1978 | Sargeant ................................... 74/501 |
| 5,165,137 | 11/1992 | Amrein et al. .............................. 5/640 |
| 5,509,180 | 4/1996 | Benetti et al. .............................. 24/68 |
| 5,676,487 | 10/1997 | Lautenschlager et al. ............. 403/231 |

*Primary Examiner*—Lynne Reichard
*Assistant Examiner*—David E. Bochna
*Attorney, Agent, or Firm*—Dean L. Ellis

[57] ABSTRACT

A turnbuckle actuator between a mast jacket of a motor vehicle steering column and a tilt housing pivotally supported on the mast jacket. The turnbuckle actuator includes a first turnbuckle yoke, a second turnbuckle yoke, and a turnbuckle shaft. The first and the second turnbuckle yokes are supported on respective ones of the mast jacket and the tilt housing for rotation about parallel lateral centerlines of the mast jacket and the tilt housing. The first turnbuckle yoke has a transverse bore therein eccentric relative to the lateral centerline of the mast jacket. The second turnbuckle yoke has a transverse bore therein eccentric relative to the lateral centerline of the tilt housing. Opposite hand screw threads on the turnbuckle shaft mesh with matching screw threads in the transverse bores. Rotation of the turnbuckle shaft thrusts the turnbuckle yokes in opposite directions to pivot the tilt housing. The thrust of the turnbuckle shaft also pivots the first and the second turnbuckle yokes in opposite directions about the lateral centerlines of the mast jacket and the tilt housing to eliminate lash by tipping the transverse bores endwise and wedging the screw threads therein against the screw threads on the turnbuckle shaft.

11 Claims, 2 Drawing Sheets

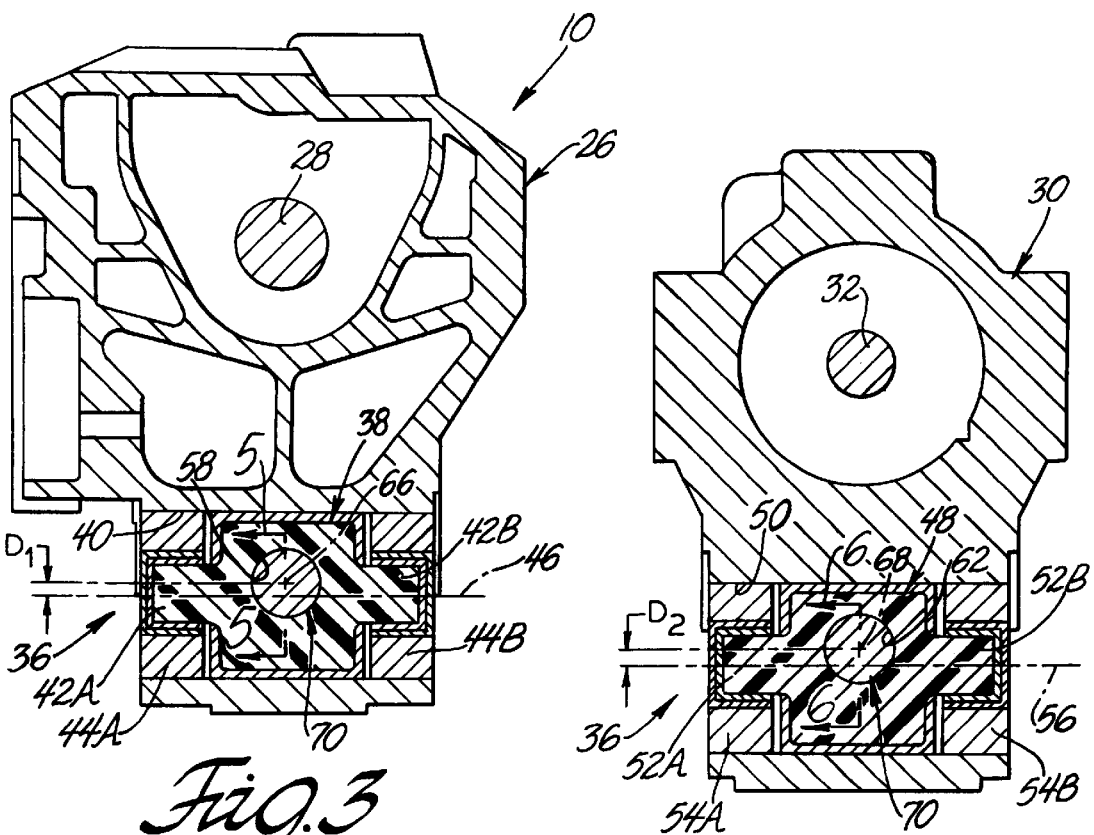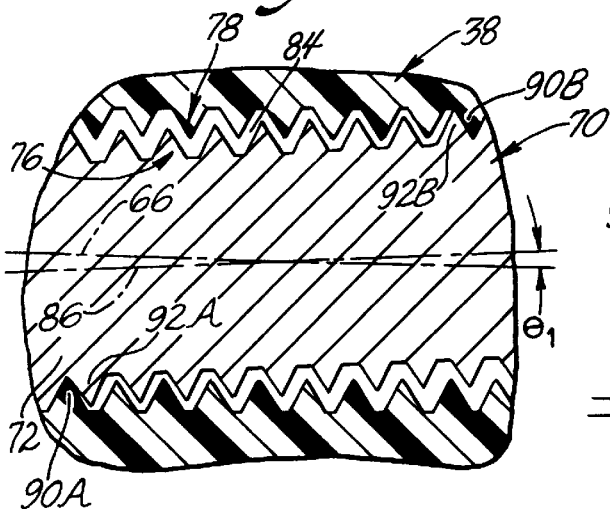

TURNBUCKLE ACTUATOR

TECHNICAL FIELD

This invention relates to a turnbuckle actuator between a stationary structural element and an adjustable structural element pivotally connected to the stationary structural element.

BACKGROUND OF THE INVENTION

A turnbuckle actuator described in U.S. Pat. No. 2,557,736 includes a first turnbuckle yoke having a transverse bore therein, a second turnbuckle yoke having a transverse bore therein, and a turnbuckle shaft having opposite hand screw threads at opposite ends thereof. The first turnbuckle yoke is supported on a base of a swivel chair for rotation about a lateral centerline of the base. The second turnbuckle yoke is supported on a back rest of the swivel chair for rotation about a lateral centerline of the back rest parallel to the lateral centerline of the base. The back rest is pivotally supported on the base. The opposite hand screw threads on the turnbuckle shaft mesh with matching screw threads in the transverse bores in the first and the second turnbuckle yokes. A longitudinal centerline of the turnbuckle shaft intersects the lateral centerlines of the base of the swivel chair and the back rest of the swivel chair. Rotation of the turnbuckle shaft thrusts the turnbuckle yokes in opposite linear directions relative to the longitudinal centerline of the turnbuckle shaft to pivot the back rest of the swivel chair relative to the base of the swivel chair. A turnbuckle actuator according to this invention is an improvement relative to the turnbuckle actuator described in the aforesaid U.S. Pat. No. 2,557,736.

SUMMARY OF THE INVENTION

This invention is a new and improved turnbuckle actuator between a stationary structural element in the form of a mast jacket of a motor vehicle steering column and an adjustable structural element in the form of a tilt housing supported on the mast jacket for up and down pivotal movement. The turnbuckle actuator includes a first turnbuckle yoke, a second turnbuckle yoke, and a turnbuckle shaft having opposite hand screw threads at opposite ends thereof. The first and the second turnbuckle yokes are supported on respective ones of the mast jacket and the tilt housing for rotation about parallel lateral centerlines of the mast jacket and the tilt housing. The first turnbuckle yoke has a transverse bore therein eccentric relative to the lateral centerline of the mast jacket. The second turnbuckle yoke has a transverse bore therein eccentric relative to the lateral centerline of the tilt housing. The opposite hand screw threads on the turnbuckle shaft mesh with matching screw threads in the transverse bores. Rotation of the turnbuckle shaft thrusts the turnbuckle yokes in opposite linear directions relative to a longitudinal centerline of the turnbuckle shaft to pivot the tilt housing up and down. The thrust of the turnbuckle shaft also pivots the first and the second turnbuckle yokes in opposite directions about the lateral centerlines of the mast jacket and the tilt housing to eliminate lash by tipping the transverse bores endwise and wedging the screw threads therein against the screw threads on the turnbuckle shaft.

BRIEF DESCRIPTION OF THE DRAWINGS

FIG. 3 is a sectional view taken generally along the plane indicated by lines 3—3 in FIG. 2;

FIG. 4 is a sectional view taken generally along the plane indicated by lines 4—4 in FIG. 2;

FIG. 5 is an enlarged sectional view taken generally along the plane indicated by lines 5—5 in FIG. 3; and FIG. 6 is an enlarged sectional view taken generally along the plane indicated by lines 6—6 in FIG. 4.

DESCRIPTION OF THE PREFERRED EMBODIMENT

Figure 1:
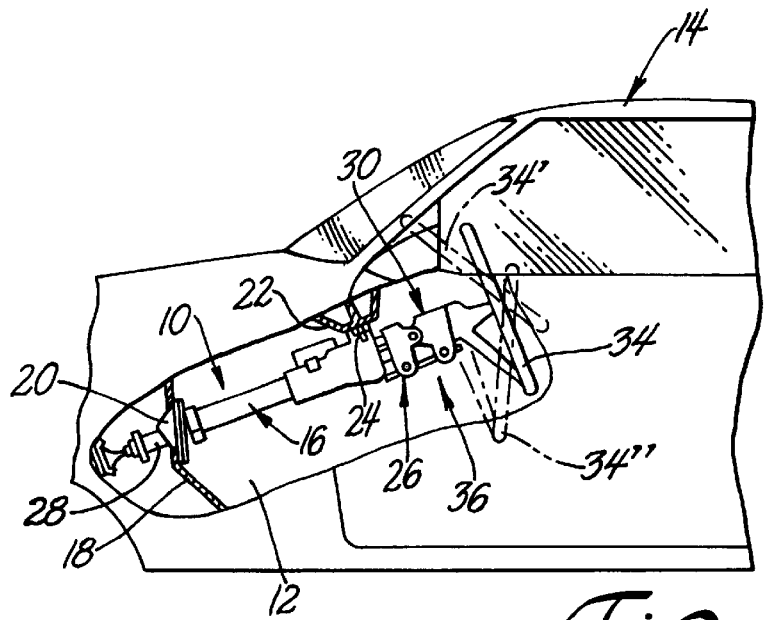
FIG. 1 is a partially broken-away side view of a motor vehicle having a steering column thereon adjustable by a turnbuckle actuator according to this invention thereon.

A steering column 10 is disposed in a passenger compartment 12 of a body 14 of a motor vehicle and includes a tubular mast jacket 16 attached to a vertical panel 18 of the body 14 through a lower bracket 20 and to another structural element 22 of the body 14 through an upper bracket 24. A support housing 26 is rigidly attached to the mast jacket 16 near the top of the steering column. A lower steering shaft 28 is rotatably supported on the mast jacket 16. A tilt housing 30 is connected to the support housing 26 for up and down pivotal movement. An upper steering shaft 32 is rotatably supported on the tilt housing and connected to the lower steering shaft 28 through a universal coupling, not shown. A steering hand wheel 34 is rigidly connected to the upper steering shaft 32 and thereby rotatably supported on the tilt housing 30. The mast jacket 16 and the support housing 26 constitute a stationary structural element. The tilt housing 30 and the steering hand wheel 34 constitute an adjustable structural element pivotally supported on the stationary structural element. A turnbuckle actuator 36 according to this invention is disposed between the stationary and the adjustable structural elements.

The turnbuckle actuator 36 includes a first turnbuckle yoke 38 in a bore 40 in the support housing 26. The first turnbuckle yoke has a pair of cylindrical trunnions 42A,42B which cooperate with a pair of rings 44A,44B in the bore 40 in supporting the first turnbuckle yoke on the support housing 26 for rotation about a lateral centerline 46 of the support housing. A second turnbuckle yoke 48 of the turnbuckle actuator 36 is disposed in a bore 50 in the tilt housing 30. The second turnbuckle yoke has a pair of cylindrical trunnions 52A,52B which cooperate with a pair of rings 54A,54B in the bore 50 in supporting the second turnbuckle yoke on the tilt housing 30 for rotation about a lateral centerline 56 of the tilt housing parallel to the lateral centerline 46 of the support housing.

The first turnbuckle yoke 38 has a transverse bore 58 therein exposed at opposite ends through respective ones of a pair of windows 60A,60B in the support housing 26. The second turnbuckle yoke 48 has a transverse bore 62 therein exposed at opposite ends through respective ones of a pair of windows 64A,64B in the tilt housing 30. The transverse bore 58 is an eccentric bore relative to the lateral centerline 46 of the support housing by virtue of an offset dimension $D_1$, illustrated in exaggerated fashion in FIG. 3, separating the lateral centerline 46 from a longitudinal centerline 66 of the transverse bore 58. Similarly, the transverse bore 62 is an eccentric bore relative to the lateral centerline 56 of the tilt housing by virtue of an offset dimension $D_2$, illustrated in exaggerated fashion in FIG. 4, separating the lateral centerline 56 from a longitudinal centerline 68 of the transverse bore 62. The offset dimensions $D_1,D_2$ are preferably but not necessarily equal to each other.

A turnbuckle shaft 70 of the turnbuckle actuator 36 has a first end 72 in the transverse bore 58 in the first turnbuckle yoke 38 and a second end 74 in the transverse bore 62 in the second turnbuckle yoke 48. A screw thread 76 on the first end 72 of the turnbuckle shaft having a right hand lead meshes with a matching screw thread 78 in the transverse bore 58. A screw thread 80 on the second end 74 of the turnbuckle shaft having a left hand lead meshes with a matching screw thread 82 in the transverse bore 62. A dimensional clearance 84, illustrated in exaggerated fashion in FIGS. 5–6, between the screw threads 76,78 and 80,82 minimizes sliding friction and manufacturing expense. The screw threads 76,78 and 80,82 cooperate in supporting the turnbuckle shaft 70 on turnbuckle yokes 38,48 for rotation about the longitudinal centerlines 66,68 of the transverse bores and a nominally coincident longitudinal centerline 86 of the turnbuckle shaft. A manual or electric motor drive, not shown, may be coupled to the turnbuckle shaft at either of a pair of end fittings 88 thereon.

The screw threads 76,80 on the turnbuckle shaft 70 cooperate with the matching screw threads 78,82 in the transverse bores 58,62 in converting rotation of the turnbuckle shaft into linear thrust on the turnbuckle yokes 38,48 in the direction of the nominally coincident centerlines 66,68,86. Rotation of the turnbuckle shaft in a first direction increases the separation between the turnbuckle yokes 38,48 and pivots the tilt housing 30 up to adjust the steering column toward an upper limit position 34', FIG. 1, of the steering hand wheel 34. Rotation of the turnbuckle shaft in an opposite second direction reduces the separation between the turnbuckle yokes and pivots the tilt housing down to adjust the steering column toward a lower limit position 34", FIG. 1, of the steering hand wheel. The helix angle of the screw threads 76,78 and 80,82 is calculated to prevent the turnbuckle shaft being back driven from the tilt housing or from the steering hand wheel.

The eccentricity of the transverse bores 58,62 relative to the lateral centerlines 46,56 causes the thrust of the turnbuckle shaft 70 on the turnbuckle yokes 38,48 in the direction of the nominally coincident longitudinal centerlines 66,68,86 to rotate each of turnbuckle yokes about corresponding ones of the lateral centerlines 46,56. Such rotation tips the transverse bores 58,62 endwise on the first and the second ends 72,74 of the turnbuckle shaft until diagonally opposite segments of the screw threads on the turnbuckle shaft are wedged between correspondingly diagonally opposite segments of the matching screw threads in the transverse bores in the first and the second turnbuckle yokes.

Figure 2:
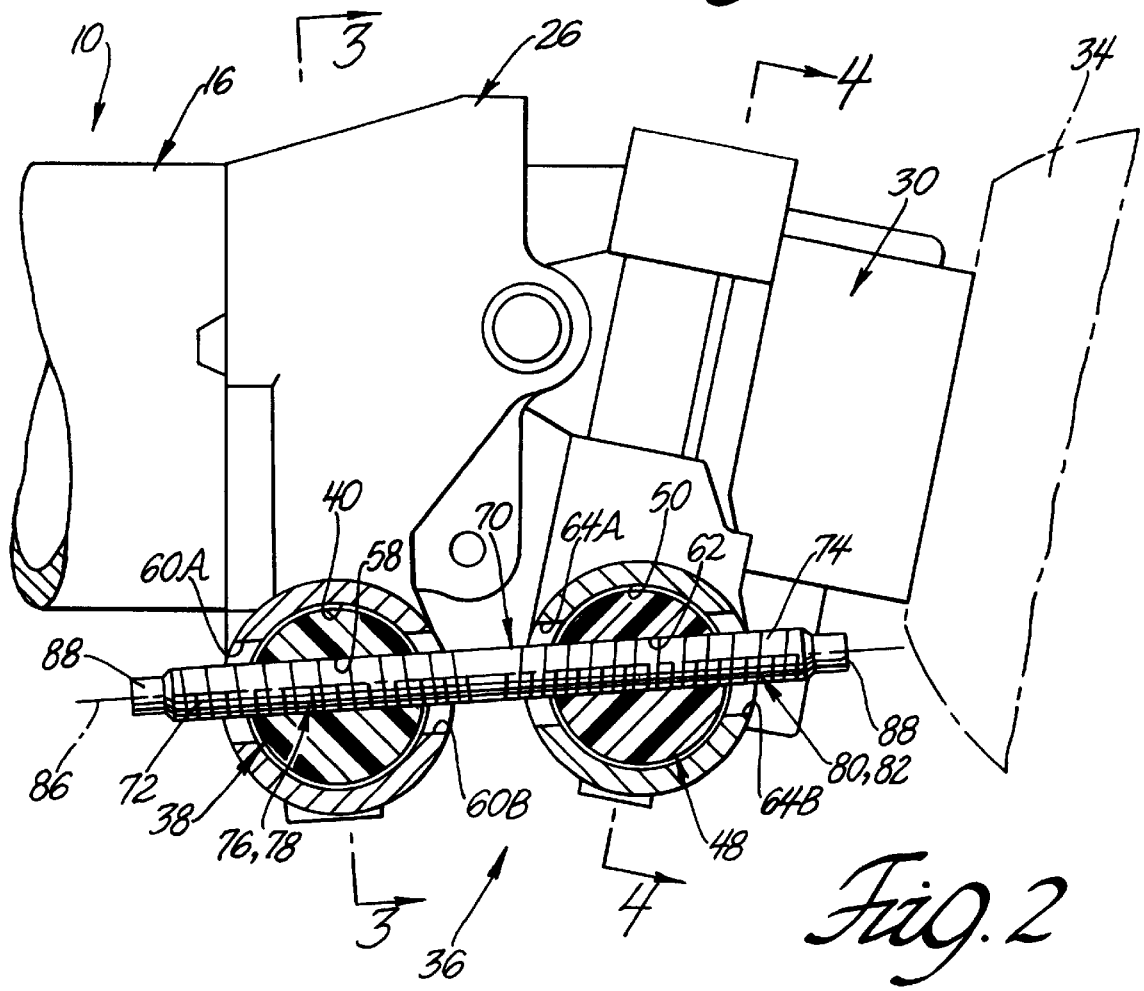
FIG. 2 is an enlarged partially broken-away view of the turnbuckle actuator according to this invention.

For example, when the turnbuckle shaft 70 is rotated to pivot the tilt housing down, FIG. 2, the thrust of the turnbuckle shaft rotates the first turnbuckle yoke 38 clockwise, FIGS. 2 and 5, about the lateral centerline 46 of the stationary housing. Such rotation tips the transverse bore 58 endwise relative to the first end 72 of the turnbuckle shaft as illustrated by the angle θ₁ between the longitudinal centerlines 66,86 of the transverse bore 58 and the turnbuckle shaft 70 and wedges a pair of diagonally opposite segments 90A,90B of the screw thread 78 in the transverse bore 58 against a pair of correspondingly diagonally opposite segments 92A,92B of the screw thread 76 on the turnbuckle shaft. With the screw threads 90A,92A and 90B,92B thus wedged together, lash attributable to the dimensional clearance 84, which would otherwise manifest itself as relative linear translation between the turnbuckle yoke 38 and the turnbuckle shaft 70, is eliminated.

Similarly, when the turnbuckle shaft is rotated to pivot the tilt housing down, FIG. 2, the thrust of the turnbuckle shaft rotates the second turnbuckle yoke 48 counterclockwise, FIGS. 2 and 6, about the lateral centerline 56 of the tilt housing. Such rotation tips the transverse bore 62 endwise relative to the second end 74 of the turnbuckle shaft as illustrated by the angle θ₂ between the longitudinal centerlines 68,86 of the transverse bore 62 and the turnbuckle shaft 70 and wedges a pair of diagonally opposite segments 94A,94B of the screw thread 82 in the transverse bore 62 against a pair of correspondingly diagonally opposite segments 96A,96B of the screw thread 80 on the turnbuckle shaft. With the screw threads 94A,96A and 94B,96B thus wedged together, lash attributable to the dimensional clearance 84, which would otherwise manifest itself as relative linear translation between the turnbuckle yoke 48 and the turnbuckle shaft 70, is eliminated.

The performance of the turnbuckle actuator 36 according to this invention in the above described adjustable steering column environment is superior to the performance of prior turnbuckle actuators such as described in the aforesaid U.S. Pat. No. 2,557,736 in which the longitudinal centerline of the turnbuckle shaft intersects the lateral centerlines of the turnbuckle yokes, i.e. in which the offset dimensions $D_1, D_2$ are zero. With such prior turnbuckle actuators, the combination of lash attributable to the dimensional clearance 84 and friction which retards pivotal movement of the tilt housing in the lowering direction may result in audible or tactile chatter of the tilt housing during pivotal movement in the lowering direction. In the turnbuckle actuator according to this invention where lash is eliminated by the aforesaid diagonally opposite segments of the matching screw threads being wedged together, the relative back and forth linear translation between the screw threads which produces the aforesaid audible or tactile chatter is effectively suppressed.

Having thus described the invention, what is claimed is:

1. In a turnbuckle actuator between a stationary element and an adjustable element pivotally supported on said stationary including a first turnbuckle yoke supported on said stationary element for rotation about a lateral centerline of said stationary element, a second turnbuckle yoke supported on said adjustable element for rotation about a lateral centerline of said adjustable element parallel to said lateral centerline of said stationary element, a transverse bore in said first turnbuckle yoke, a transverse bore in said second turnbuckle yoke, a turnbuckle shaft having a first end in said transverse bore in said first turnbuckle yoke and a second end in said transverse bore in said second turnbuckle yoke, a first screw thread on said first end of said turnbuckle shaft meshing with a matching screw thread in said transverse bore in said first turnbuckle yoke, and a second screw thread on said second end of said turnbuckle shaft having an opposite lead relative to the lead of said first screw thread meshing with a matching screw thread in said transverse bore in said second turnbuckle yoke so that rotation of said turnbuckle shaft varies the separation between said first turnbuckle yoke and said second turnbuckle yoke in the direction of a longitudinal centerline of said turnbuckle shaft, the improvement comprising:

a means operative in response to rotation of said turnbuckle shaft to pivot one of said first turnbuckle yoke and said second turnbuckle yoke relative to said turnbuckle shaft to tip said transverse bore therein endwise and wedge a pair of diagonally opposite segments of said screw thread in said tipped transverse bore against a pair of diagonally opposite segments of said screw thread on the one of said first end and said second end of said turnbuckle shaft therein so that lash in the direction of said longitudinal centerline of said turnbuckle shaft between said turnbuckle shaft and said one of said first turnbuckle yoke and said second turnbuckle yoke is eliminated.

2. The turnbuckle actuator recited in claim 1 wherein said means operative in response to rotation of said turnbuckle shaft to pivot one of said first turnbuckle yoke and said second turnbuckle yoke relative to said turnbuckle shaft to tip said transverse bore therein endwise comprises:

said longitudinal centerline of said turnbuckle shaft being separated from said lateral centerline of said one of said first turnbuckle yoke and said second turnbuckle yoke by an offset dimension so that said transverse bore in said one of said first turnbuckle yoke and said second turnbuckle yoke is eccentric relative to said lateral centerline of said one of said first turnbuckle yoke and said second turnbuckle yoke.

3. The turnbuckle actuator recited in claim 2 further comprising:

a second means operative in response to rotation of said turnbuckle shaft to pivot the other of said first turnbuckle yoke and said second turnbuckle yoke relative to said turnbuckle shaft to tip said transverse bore therein endwise and wedge a pair of diagonally opposite segments of said screw thread in said tipped transverse bore against a pair of diagonally opposite segments of said screw thread on the other of said first end and said second end of said turnbuckle shaft therein so that lash in the direction of said longitudinal centerline of said turnbuckle shaft between said turnbuckle shaft and said other of said first turnbuckle yoke and said second turnbuckle yoke is eliminated.

4. The turnbuckle actuator recited in claim 3 wherein said second means operative in response to rotation of said turnbuckle shaft to pivot the other of said first turnbuckle yoke and said second turnbuckle yoke relative to said turnbuckle shaft to tip said transverse bore therein endwise comprises:

said longitudinal centerline of said turnbuckle shaft being separated from said lateral centerline of said other of said first turnbuckle yoke and said second turnbuckle yoke by an offset dimension so that said transverse bore in said other of said first turnbuckle yoke and said second turnbuckle yoke is eccentric relative to said lateral centerline of the other of said first turnbuckle yoke and said second turnbuckle yoke.

5. The turnbuckle actuator recited in claim 4 wherein:

said offset dimension between said longitudinal centerline of said turnbuckle shaft and said lateral centerline of said one of said first turnbuckle yoke and said second turnbuckle yoke equals said offset dimension between said longitudinal centerline of said turnbuckle shaft and said lateral centerline of the other of said first turnbuckle yoke and said second turnbuckle yoke.

6. In a turnbuckle actuator between a stationary element and an adjustable element pivotally supported on said stationary including a first turnbuckle yoke supported on said stationary element for rotation about a lateral centerline of said stationary element, said stationary element comprising a mast jacket of a steering column of a motor vehicle, a second turnbuckle yoke supported on said adjustable element for rotation about a lateral centerline of said adjustable element parallel to said lateral centerline of said stationary element, said adjustable element comprising a tilt housing, a transverse bore in said first turnbuckle yoke, a transverse bore in said second turnbuckle yoke, a turnbuckle shaft having a first end in said transverse bore in said first turnbuckle yoke and a second end in said transverse bore in said second turnbuckle yoke, a first screw thread on said first end of said turnbuckle shaft meshing with a matching screw thread in said transverse bore in said first turnbuckle yoke, and a second screw thread on said second end of said turnbuckle shaft having an opposite lead relative to the lead of said first thread meshing with a matching screw thread in said transverse bore in said second turnbuckle yoke so that rotation of said turnbuckle shaft varies the separation between said first turnbuckle yoke and said second turnbuckle yoke in the direction of a longitudinal centerline of said turnbuckle shaft, the improvement comprising:

a first means operative in response to rotation of said turnbuckle shaft to pivot one of said first turnbuckle yoke and said second turnbuckle yoke relative to said turnbuckle shaft to tip said transverse bore therein endwise and wedge a pair of diagonally opposite segments of said screw thread in said tipped transverse bore against a pair of diagonally opposite segments of said screw thread on the one of said first end and said second end of said turnbuckle shaft therein so that lash in the direction of said longitudinal centerline of said turnbuckle shaft between said turnbuckle shaft and said one of said turnbuckle yoke and said second turnbuckle yoke is eliminated, wherein said first means includes said longitudinal centerline of said turnbuckle shaft being separated from said lateral centerline of said one of said first turnbuckle yoke and said second turnbuckle yoke and said second turnbuckle yoke by an offset dimension so that said transverse bore in said one of said first turnbuckle yoke and said second turnbuckle yoke is eccentric relative to said lateral centerline of said one of said first turnbuckle yoke and said second turnbuckle yoke: and a second means operative in response to rotation of said turnbuckle shaft to pivot the other of said first turnbuckle yoke and said second turnbuckle yoke relative to said turnbuckle shaft to tip said transverse bore therein endwise and wedge a pair of diagonally opposite segments of said screw thread in said tipped transverse bore against a pair of diagonally opposite segments of said screw thread on the other of said first end and said second end of said turnbuckle shaft therein so that lash in the direction of said longitudinal centerline of said turnbuckle shaft between said turnbuckle shaft and said other of said first turnbuckle yoke and said second turnbuckle yoke is eliminated, wherein said second means includes said longitudinal centerline of said turnbuckle shaft being separated from said lateral centerline of said other of said first turnbuckle yoke and said second turnbuckle yoke by an offset dimension so that said transverse bore in said other of said first turnbuckle yoke and said second turnbuckle yoke is eccentric relative to said lateral centerline of the other of said first turnbuckle yoke and said second turnbuckle yoke, wherein said offset dimension between said longitudinal centerline of said turnbuckle shaft and said lateral centerline of said one of said first turnbuckle yoke and said second turnbuckle yoke equals said offset dimension between said longitudinal centerline of said turnbuckle shaft and said lateral centerline of the other of said first turnbuckle yoke and said second turnbuckle yoke.

7. In a turnbuckle actuator between a stationary element and an adjustable element pivotally supported on said stationary element including a first turnbuckle yoke supported on said stationary element for rotation about a lateral centerline of said stationary element, said stationary element comprising a mast jacket of a steering column of a motor vehicle, a second turnbuckle yoke supported on said adjustable element for rotation about a lateral centerline of said adjustable element parallel to said lateral centerline of said stationary element, said adjustable element comprising a tilt housing, a transverse bore in said first turnbuckle yoke, a transverse bore in said second turnbuckle yoke, a turnbuckle shaft having a first end in said transverse bore in said first turnbuckle yoke and a second end in said transverse bore in said second turnbuckle yoke, a first screw thread on said first end of said turnbuckle shaft meshing with a matching screw thread in said transverse bore in said first turnbuckle yoke, and a second screw thread on said second end of said turnbuckle shaft having an opposite lead relative to the lead of said first thread meshing with a matching screw thread in said transverse bore in said second turnbuckle yoke so that rotation of said turnbuckle shaft varies the separation between said first turnbuckle yoke and said second turnbuckle yoke in the direction of a longitudinal centerline of said turnbuckle shaft, the improvement comprising:

a means operative in response to rotation of said turnbuckle shaft to pivot one of said first turnbuckle yoke and said second turnbuckle yoke relative to said turnbuckle shaft to tip said transverse bore therein endwise and wedge a pair of diagonally opposite segments of said screw thread in said tipped transverse bore against a pair of diagonally opposite segments of said screw thread on the one of said first end and said second end of said turnbuckle shaft therein so that lash in the direction of said longitudinal centerline of said turnbuckle shaft between said turnbuckle shaft and said one of said turnbuckle yoke and said second turnbuckle yoke is eliminated.

8. The turnbuckle actuator recited in claim 7 wherein said means operative in response to rotation of said turnbuckle shaft to pivot one of said first turnbuckle yoke and said second turnbuckle yoke relative to said turnbuckle shaft to tip said transverse bore therein endwise comprises:

said longitudinal centerline of said turnbuckle shaft being separated from said lateral centerline of said one of said first turnbuckle yoke and said second turnbuckle yoke and said second turnbuckle yoke by an offset dimension so that said transverse bore in said one of said first turnbuckle yoke and said second turnbuckle yoke is eccentric relative to said lateral centerline of said one of said first turnbuckle yoke and said second turnbuckle yoke.

9. The turnbuckle actuator recited in claim 8 further comprising:

a second means operative in response to rotation of said turnbuckle shaft to pivot the other of said first turnbuckle yoke and said second turnbuckle yoke relative to said turnbuckle shaft to tip said transverse bore therein endwise and wedge a pair of diagonally opposite segments of said screw thread in said tipped transverse bore against a pair of diagonally opposite segments of said screw thread on the other of said first end and said second end of said turnbuckle shaft therein so that lash in the direction of said longitudinal centerline of said turnbuckle shaft between said turnbuckle shaft and said other of said first turnbuckle yoke and said second turnbuckle yoke is eliminated.

10. The turnbuckle actuator recited in claim 9 wherein said second means operative in response to rotation of said turnbuckle shaft to pivot the other of said first turnbuckle yoke and said second turnbuckle yoke relative to said turnbuckle shaft to tip said transverse bore therein endwise comprises:

said longitudinal centerline of said turnbuckle shaft being separated from said lateral centerline of said other of said first turnbuckle yoke and said second turnbuckle yoke by an offset dimension so that said transverse bore in said other of said first turnbuckle yoke and said second turnbuckle yoke is eccentric relative to said lateral centerline of the other of said first turnbuckle yoke and said second turnbuckle yoke.

11. The turnbuckle actuator recited in claim 10 wherein:

said offset dimension between said longitudinal centerline of said turnbuckle shaft and said lateral centerline of said one of said first turnbuckle yoke and said second turnbuckle yoke equals said offset dimension between said longitudinal centerline of said turnbuckle shaft and said lateral centerline of the other of said first turnbuckle yoke and said second turnbuckle yoke.

* * * * *